Patented Apr. 30, 1940

2,198,642

UNITED STATES PATENT OFFICE 2,198,642

STABLE SOLUTIONS OF CALCIUM THIO-SULPHATE AND A PROCESS FOR THE MANUFACTURE THEREOF

Josef Vonkennel and Josef Kimmig, Munich, Germany, assignors to Schering Aktiengesellschaft, a corporation of Germany No Drawing. Application September 14, 1936, Serial No. 100,680. In Germany September 14, 1935

11 Claims. (Cl. 23—115)

This invention relates to stable solutions of calcium thiosulphate and to a process for the manufacture thereof.

Calcium thiosulphate, as it is obtained by known methods, is a compound the aqueous solution of which, as is seen for example from Ullmann Enzyklopädie der technischen Chemie, vol. 3, page 228 (1916), already on heating above 60° C. decomposes to calcium sulphite and sulphur.

In contradistinction thereto the present invention renders possible the production of a calcium thiosulphate the aqueous solutions of which are still stable at temperatures above 80° C., the product being thus easily sterilizable by heating. Such a product is capable of extensive therapeutic application since it is suitable for use where calcium or thiosulphate (as in hydrocyanic acid poisoning) or both are indicated. It can be directly administered by intravenous injection.

The essential feature of the present invention consists in that calcium thiosulphate solutions, such as are obtained for example by the interaction of calcium chloride with sodium thiosulphate, are freed by filtration through Berkefeld filters or by other suitable methods from the last traces of uncombined or elemental sulphur present therein. It is to be recommended to combine the removal of the sulphur with a purification of the product by repeated recrystallisation.

As particularly suitable has proved the production and purification process described in detail in the following example; however, it is possible to use as starting material calcium thiosulphate produced by other methods so long as during the purification process care is taken that any trace of free sulphur is removed from the product.

Preferably according to the present process the purification is conducted in such high concentrations that a subsequent concentration of the reaction solution in vacuum is not necessary.

The following example illustrates the invention:

Example 1110 grams of calcium chloride are dissolved at 50° C. in 200 ccs. of water and to the solution are added at 45–50° C. in the course of 20 minutes and with good stirring or shaking 1260 grams of a very finely powdered sodium thiosulphate. Thereupon the reaction mixture is allowed to stand for about 40–50 minutes, whereupon most of the sodium chloride produced separates out. The milky white filtrate filtered off from the common salt is thereupon suitably cooled to 0° C., whereby the calcium thiosulphate crystallises out in the form of beautiful colourless triclinic crystals. The crystals are filtered with suction on a glass filter and recrystallised at least twice from a little water. For this purpose 1000 grams of crude product are treated with 200 ccs. of distilled water and the mixture heated with stirring to 70–80° C., filtered with suction from traces of undissolved sulphur and sodium chloride and the filtrate kept for 4 hours in an ice chest. Thereupon the separated crystals are filtered off, again dissolved in 200 ccs. of water at 60° C., and after filtration with suction, the mass which crystallises out at 0° C. is dried in a vacuum desiccator over sulphuric acid. The drying is advantageously effected in a dry stream of nitrogen at room temperature.

For the manufacture of stable solutions the recrystallised and dried product is dissolved in distilled water to a 10% solution and the solution suitably filtered through a Berkefeld or like filter. The solution of calcium thiosulphate thus obtained is water white. For complete sterilization it can be heated with the exclusion of air for 10 hours without decomposition to 98° C., and without the slightest turbidity being produced.

Instead of filtering the aqueous solutions through a Berkefeld or Seitz bacteria retaining filter the colloidal sulphur can also be removed in other ways, for example by treatment with animal charcoal or silica gel or the like.

It is also possible to precipitate from such a filtered solution freed from the last traces of sulphur a stable crystalline product for example by adding to a 10% aqueous solution thereof a water-miscible organic solvent such as alcohol in such quantities that the liquid consists to the extent of 50% of water. The salt thus obtained likewise gives a clear and stable solution.

Owing to the decomposing action of the air it is advisable to exclude the air as far as possible during the purification treatment.

Various other modifications in the process and reagents may be resorted to within the scope of the appended claims without departing from the principles set forth herein.

We claim:

1. Process for the manufacture of stable calcium thiosulphate solutions, comprising dissolving calcium thiosulphate in an aqueous medium and removing from the solution all traces of sulphur, including colloidal sulphur.

2. Process according to claim 1, wherein calcium thiosulphate is used as starting material which has been purified by repeated crystallization.

3. Process according to claim 1 wherein the removal of the colloidal sulphur from the calcium thiosulphate solution is effected by filtration through a Berkefeld filter.

4. Process according to claim 1, wherein pure calcium thiosulphate is employed which was obtained by bringing concentrated calcium chloride solution into reaction with solid finely powdered sodium thiosulphate at 45-50° C. whereupon first the common salt produced is removed and thereupon by cooling the calcium thiosulphate formed is caused to crystallise.

5. Process according to claim 1, wherein the calcium thiosulphate is dissolved in a little water at 70-80° C., filtered off from impurities, crystallised out by cooling to 0° C. and this crystallization repeated, whereupon the product obtained is dried in vacuum.

6. Process for the manufacture of stable crystalline calcium thiosulphate which comprises dissolving calcium thiosulphate in an aqueous medium, removing from the solution all traces of sulphur, including colloidal sulphur, and subsequently adding a water-miscible organic liquid and recovering the precipitated crystals.

7. Process according to claim 1, wherein air is excluded as far as possible during the purification treatment.

8. A stable calcium thiosulphate solution which has been sterilized by heating to temperatures above 80° C. and is free from decomposition products of calcium thiosulphate.

9. A stable calcium thiosulphate solution which has been sterilized by heating to temperatures of the order of 98° C. and is free from decomposition products of calcium thiosulphate.

10. Stable, crystalline calcium thiosulphate free from elemental sulphur, including colloidal sulphur, and which does not split off sulphur on being continuously heated in aqueous solution above 80° C. for a sufficient length of time to effect sterilization.

11. Stable, crystalline calcium thiosulphate free from elemental sulphur, including colloidal sulphur, and which does not split off sulphur on being continuously heated in aqueous solution for about 10 hours at 98° C.

J. VONKENNEL.
JOSEF KIMMIG.